(12) United States Patent
Lutz et al.

(10) Patent No.: US 7,255,911 B2
(45) Date of Patent: Aug. 14, 2007

(54) LAMINATE BODY, IN PARTICULAR A LAMINATE FOIL AND A METHOD OF INCREASING THE FORGERY-PROOF NATURE OF LAMINATE BODY

(75) Inventors: Norbert Lutz, Rückersdorf (DE); Gerhard Zinner, Leinburg (DE)

(73) Assignee: Leonard Durz GmbH & Co. KG, Furth (DE)

( * ) Notice: Subject to any disclaimer, the term of this patent is extended or adjusted under 35 U.S.C. 154(b) by 498 days.

(21) Appl. No.: 10/398,326

(22) PCT Filed: Nov. 2, 2001

(86) PCT No.: PCT/DE01/04155

§ 371 (c)(1),
(2), (4) Date: Apr. 3, 2003

(87) PCT Pub. No.: WO02/36357

PCT Pub. Date: May 10, 2002

(65) Prior Publication Data

US 2004/0022967 A1    Feb. 5, 2004

(30) Foreign Application Priority Data

Nov. 4, 2000 (DE) .................... 100 54 805
Aug. 13, 2001 (DE) .................... 101 39 719

(51) Int. Cl.
    *B32B 3/00*      (2006.01)
(52) U.S. Cl. .................. 428/195.1; 428/201; 428/203; 428/209; 428/211.1; 427/508; 427/510
(58) Field of Classification Search ............ None See application file for complete search history.

(56) References Cited

U.S. PATENT DOCUMENTS

| | | | |
|---|---|---|---|
| 4,523,777 A | 6/1985 | Holbein et al. | |
| 4,911,302 A | 3/1990 | Butler | |
| 5,298,922 A | 3/1994 | Merkle et al. | |
| 5,886,798 A * | 3/1999 | Staub et al. | 359/2 |
| 5,985,078 A * | 11/1999 | Suess et al. | 156/239 |
| 6,082,778 A * | 7/2000 | Solmsdorf | 283/82 |

(Continued)

FOREIGN PATENT DOCUMENTS

DE      81 30 861      1/1983

(Continued)

*Primary Examiner*—Jennifer McNeil
*Assistant Examiner*—Timothy M. Speer
(74) *Attorney, Agent, or Firm*—Hoffman & Baron, LLP

(57) ABSTRACT

Described is a laminate body, in particular a laminate foil, comprising a laser-sensitive layer and an identification element, for example a diffraction and/or hologram structure, a reflection layer, a printed image or the like, which is provided in a second layer and/or in the laser-sensitive layer, wherein the laser-sensitive layer has a marking produced by laser action, which is positioned in accurate register relationship relative to the identification element In addition the subject of the invention is a method of enhancing the forgery-proof nature of such a laminate body in which the laminate body is irradiated by means of a laser so that produced in the laser-sensitive layer is a laser-induced marking positioned in accurate register relationship with the position of the identification element.

35 Claims, 14 Drawing Sheets

U.S. PATENT DOCUMENTS 6,627,286 B1 * 9/2003 Lutz .................... 428/40.9

FOREIGN PATENT DOCUMENTS

| | | |
|---|---|---|
| DE | 37 38 330 A1 | 5/1988 |
| DE | 41 31 964 A1 | 4/1993 |
| DE | 43 33 546 A1 | 4/1995 |
| DE | 44 10 431 A1 | 9/1995 |
| DE | 195 22 397 A1 | 1/1997 |
| EP | 0 190 997 B1 | 8/1986 |
| EP | 0 219 011 B1 | 4/1987 |
| EP | 0 327 508 A2 | 8/1989 |
| EP | 0 416 664 A1 | 3/1991 |
| EP | 0 420 261 A2 | 4/1991 |
| EP | 0 537 668 A2 | 4/1993 |
| EP | 0 678 400 A1 | 10/1995 |
| EP | 0 741 370 B1 | 11/1996 |
| GB | 2 240 948 A | 8/1991 |
| WO | WO94/12352 | 6/1994 |
| WO | WO96/35585 | 11/1996 |

* cited by examiner

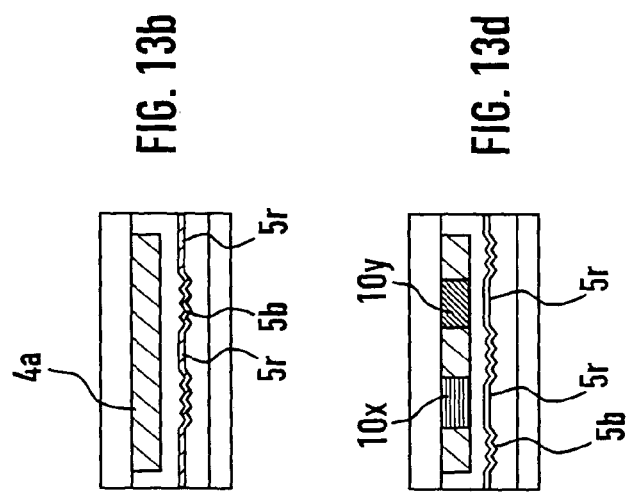
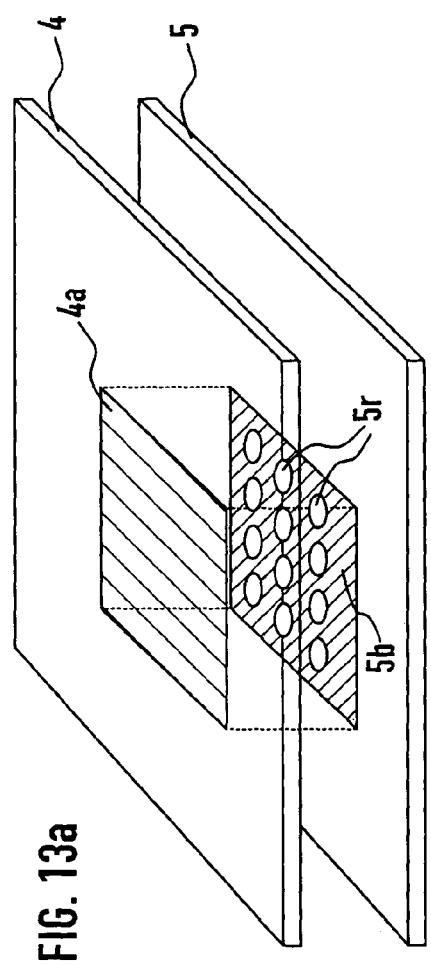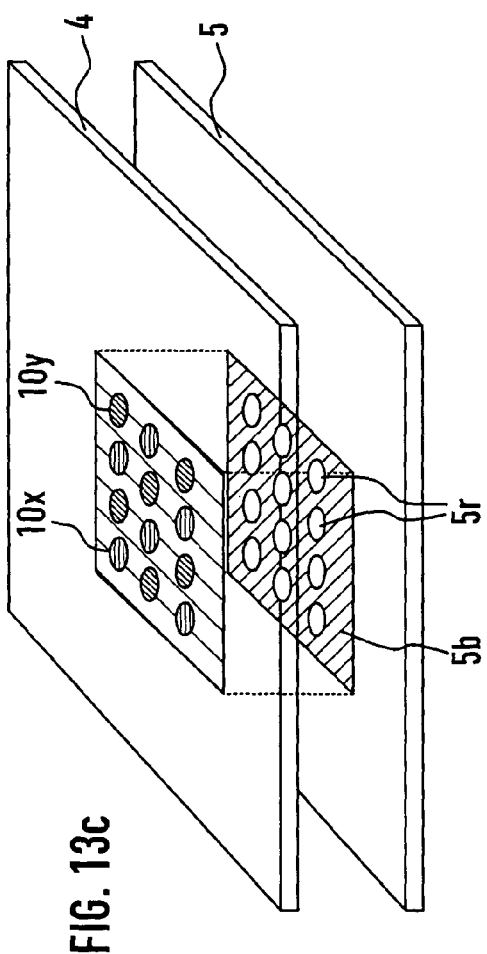
FIG. 13a
FIG. 13b
FIG. 13c
FIG. 13d

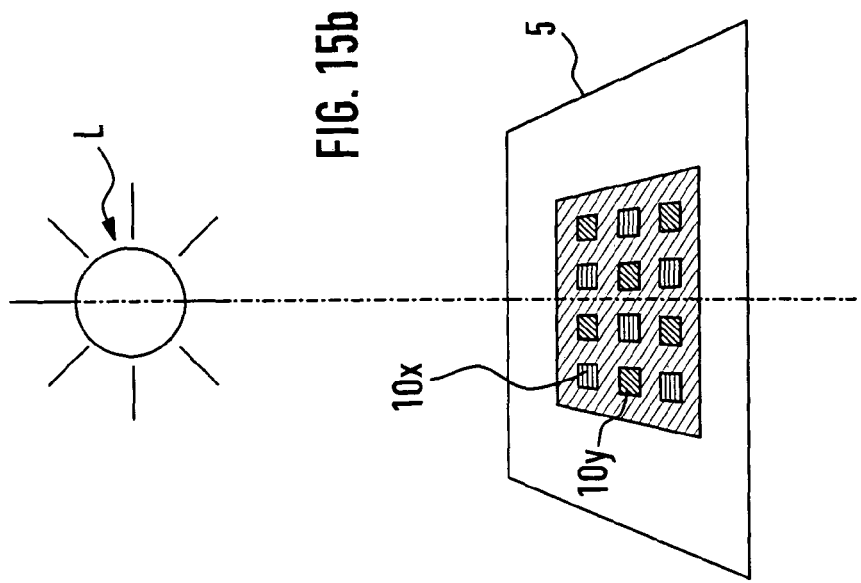
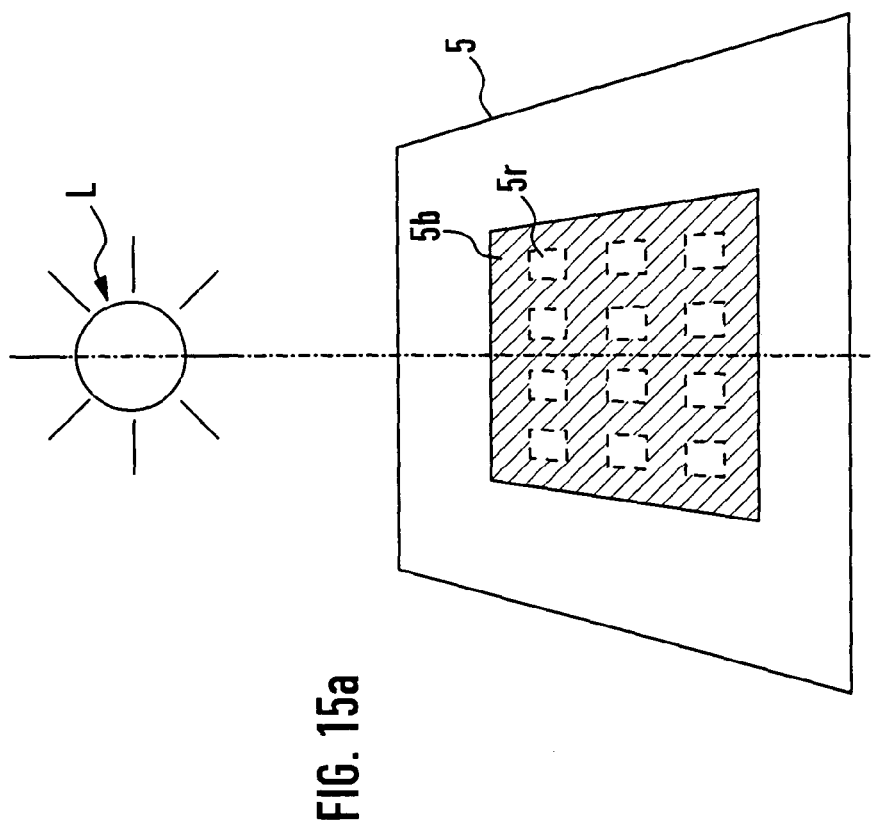

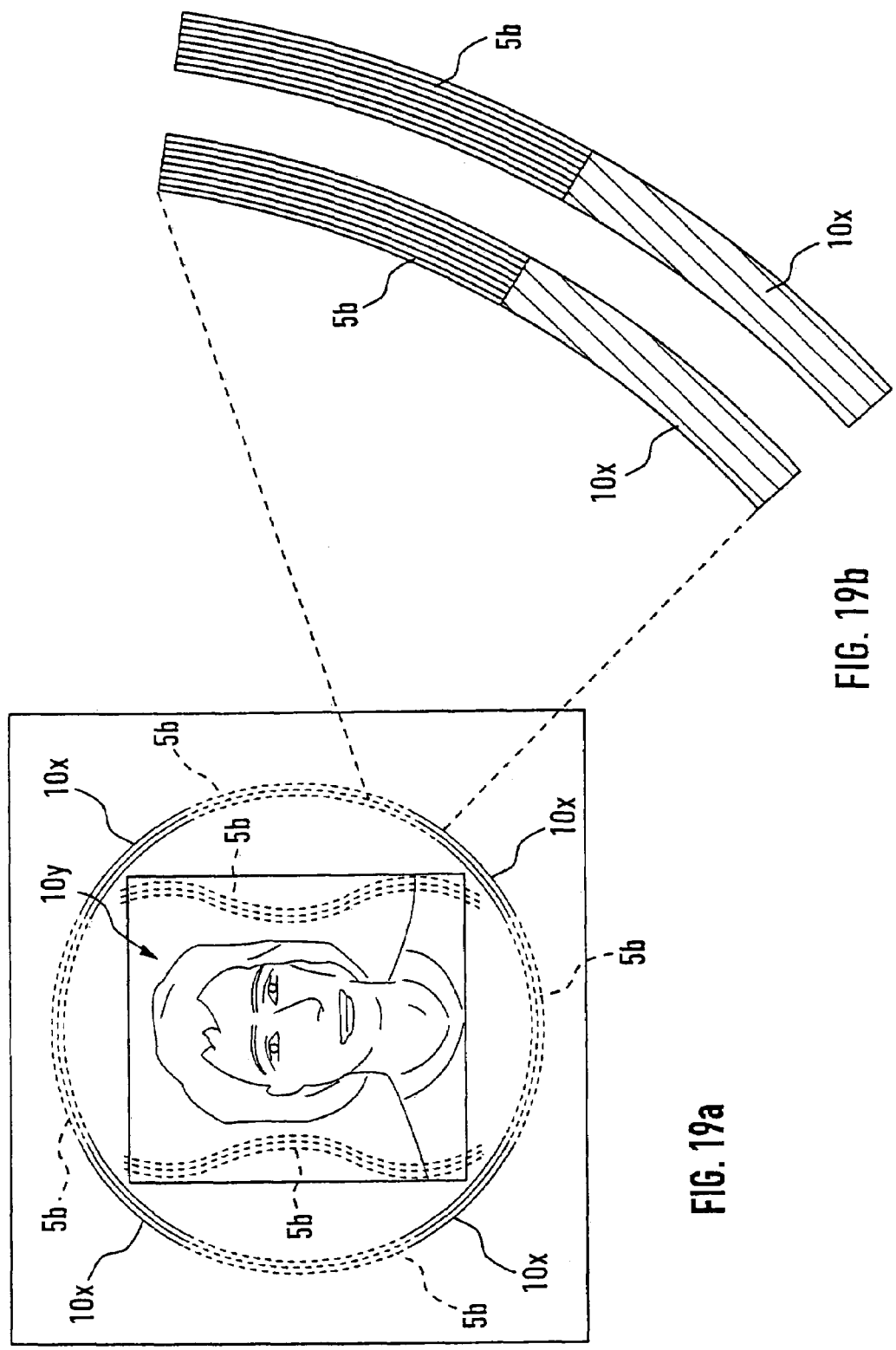

LAMINATE BODY, IN PARTICULAR A LAMINATE FOIL AND A METHOD OF INCREASING THE FORGERY-PROOF NATURE OF LAMINATE BODY

This application claims priority based on an International Application filed under the Patent Cooperation Treaty, PCT/DE01/04155, filed on Nov. 2, 2001, and German Patent Application Nos. 100 54 805.9, filed on Nov. 4, 2000 and 101 39 719.4, filed on Aug. 13, 2001.

BACKGROUND OF THE INVENTION

The invention concerns a laminate body, in particular a laminate foil having the features of the classifying portion of claim 1 and a method of increasing the forgery-proof nature of a laminate body having the feature of the classifying portion of claim 22.

DE 37 38 330 A1 discloses a laser marking method for use in relation to surfaces with a pigment coating, wherein pigments of the pigment coating change their internal molecular structure and produce different colours, at different temperatures. The specific surface temperatures are produced locally with the laser radiation effect, thereby producing coloured laser markings.

DE 44 10 431 A1 describes a method with which person-related data are applied by laser marking to an identity card, wherein the identity card has a copying-protection element applied by a transfer method. In the laser marking procedure an identification in the form of a series of digits is applied, by a part of the series of digits being applied in the copying-protection element and a further part of the series of digits being applied in an adjoining region of the identity card. The laser marking effect is implemented by way of local demetallisation in the metal layer of the copying-protection element or by blackening of the treated region of the identity card.

EP 0 219 011 B1 describes a special method of laser marking of identity cards. That method provides that black markings are produced by means of the laser in different transparent layers of the card. In that way parallax images are produced in the mutually co-operating transparent layers.

GB 2 240 948 A also describes laser marking of identity cards. Here laser marking is produced by the removal of different coloured layers. The laser marking which is produced by that procedure appears in the form of a coloured marking.

DE 41 31 964 A1 describes laser marking of a laminate foil with a metal layer and a hologram structure. The marking operation is effected by region-wise blackening and removal of layers.

EP 0 420 261 A2 discloses various measures for increasing the forgery-proof nature for systems with hot stamping foils with a hologram structure. Described therein inter alia is that laser-induced markings are produced by laser treatment in the hologram structure or in other lacquer layers of the foil. Another method of individualising foils with a hologram structure, which can be applied additionally or alternatively, is described, providing for the use of an individualising embossing stamp which imparts an individualised external contour to the hologram structure. A disadvantage with the described individualisation methods is that it is not readily possible to detect whether the situation involves a forgery, on the basis of the foil applied to the substrate, without referring to a comparative pattern.

The production of multi-colour markings in coatings is known from WO 96/35585 and WO 94/12352, while the production of single-colour markings is known from EP 0 327 508, EP 0 190 997 and DE 37 38 330. The following applies in that respect:

WO 96/35585 discloses various configurations of plastic bodies, more specifically solid bodies or coatings, which each contain a mixture of various pigments. In the various embodiments set forth by way of example the pigment mixture is composed of three pigment components, more specifically a yellow pigment, a magenta pigment and a cyan pigment. Colour marking is effected on the plastic body by laser treatment. The colour marking occurs due to bleaching of the pigments by means of the laser treatment. The laser conditions are respectively adjusted specifically with a variation in the wavelength in order to obtain given colours. The respective specific wavelength used is previously ascertained by light absorption measurements in regard to the pigments, more specifically in each case the absorption wavelength at the absorption maximum of the pigment is ascertained. Each case involves using pigments which have only one single absorption maximum. That is intended to guarantee that, in the laser treatment, the result obtained is a colour which corresponds to the colour of the laser light and the duration of the laser treatment and the intensity of the laser light for each colour can be of the same value. In the described embodiment with a pigment mixture comprising yellow pigment, magenta pigment and cyan pigment, violet laser light at a wavelength of 430 nm, blue laser light at a wavelength of 470 nm, yellow laser light at a wavelength of 575 nm and laser light, referred to as orange, at a wavelength of 650 nm, are used for the laser treatment. That is intended to produce different colour markings on the plastic body by means of the laser treatment by virtue of suitable adjustment of the laser wavelength, with the laser conditions being otherwise the same. The colours are produced by complex mixing of the pigments which at the same time are bleached at the respective laser wavelength. A method of producing as far as possible all colours with a limited number of pigments is not specified.

It is also known from WO 94/12352 to produce bright colour markings on a plastic body which contains a pigment mixture and which can be in the form of a solid body or a coating, by laser treatment using different wavelengths. The coloration effect is implemented by the pigments changing their colour due to colour transposition in the laser treatment. The laser conditions are randomly selected in each case. A method of deliberately and specifically producing any colours is not specified. In addition the number of colours produced in that way is greatly limited.

EP 0 327 508 discloses a method in which a laser-sensitive dyestuff A and a laser-insensitive dyestuff B are contained in two separate mutually superposed lasers or in a common layer and are bleached by laser treatment of the dyestuff A while the laser-insensitive dyestuff B is not bleached or is only slightly bleached. The laser treatment results in the production of a colour marking, but only a single-colour marking, that is to say at a maximum a two-colour image. The method does not provide for any variation in the laser conditions to produce different colours.

EP 0 190 997 B1 discloses a method in which a plastic plate or a plastic layer in the form of a coating on a metal plate portion contains an additive which can be coloured under the effect of laser treatment, more specifically by colour transposition from one colour into another or by conversion into black. Colour markings involving different colours are not possible in that case.

EP 0 416 664 B1 discloses producing black markings by laser markings in plastic bodies or foil layers. The markings are produced by laser-governed blackening of the laser-sensitive component molybdenum sulphite contained in the plastic material.

It is known from DE 195 22 397 A1 to produce light marking or labelling by laser treatment of plastic layers containing pigments. That is effected by laser bleaching of the pigments involved.

EP 0 537 668 and DE 81 30 861 U1 disclose region-wise removal of layers in the layer structure of transfer foils by laser treatment in order in that way to produce markings.

In addition it is known for example from EP 0 741 370 B1, DE 43 33 546 A1 or U.S. Pat. No. 4,911,302 to produce markings by laser-induced melting of the material, by virtue of laser treatment of laminate bodies, in order then to transfer those markings while still in the molten condition on to another body.

SUMMARY OF THE INVENTION

The object of the invention is to increase the forgery-proof nature of a laminate body, for example a data carrier, such as an identity card or the like.

The invention attains that object by a laminate body as set forth in claim 1 and a method of increasing the forgery-proof nature of a laminate body as set forth in claim 22.

The laminate body can be a laminate foil, for example a transfer foil, for instance a hot stamping foil or a laminating foil, but also a coated body, preferably a foil-coated plastic body. In this case the surface of the substrate can represent a layer. By virtue of the fact that the marking produced with the laser irradiation effect in the laser-sensitive layer, being the so-called laser-induced marking, is positioned in accurate register relationship, that is to say in accurately fitting relationship and/or accurately associated relationship, relative to the identification element which is already present in the layer structure prior to the laser treatment and which for example can be in the form of a diffraction and/or hologram structure, optionally with a motion effect, or which can be in the form of a printed image or in the form of a reflection area, that is to say a region involving increased light reflection and/or an increased refractive index, the result obtained is an individualisation identification which is composed in accurate register relationship and which is made up of the identification element that is already present and the laser-induced marking. The latter is preferably in the form of a full-colour image. The composition in accurate register relationship can be readily checked from the exterior without expensive equipment, preferably by simple viewing thereof, in order to establish authenticity. This means that this specific co-operation of the laser-induced marking with the respective identification element forms a combinatory effect representing a quasi synergistic effect. Specific combinatory visual effects can be produced in that case by the superimposition of diffraction colour images and laser-induced colour images.

Positioning of the laser-induced marking in accurate register relationship can be implemented by suitable control of the mass-less laser beam. Preferably control can be effected electronically, more specifically in dependence on detection of the actual position of the identification element which is already present in the layer structure and in relation to which the respective association is effected.

The laser can be controlled by the detection of configurational parameters of a background layer, preferably by detection of the printed or diffraction image and/or by detection of configurational parameters of the laser-sensitive layer or the laser-induced image constituent, in particular by means of image processing. Preferably the position, the direction of incidence of the laser light, the laser wavelength, the period of action, the number of pulses and/or the laser intensity can be controlled.

The colour markings may involve different colours. The colour markings may also each have a more or less continuous colour transition. In particular embodiments each colour marking is of a given colour shade which is constant in a given portion or over the entire region of the marking.

A particularly high level of forgery-proof nature is achieved if the laser-induced marking is in the form of a colour marking, more specifically in particular when the marking is in the form of a multi-colour marking. It is of particular advantage in this connection if the laser-induced marking is effected by laser-induced bleaching of the colouring agents present in the laser-sensitive layer.

In order to obtain a full-colour image, particular embodiments provide that the laser-sensitive material is in the form of a mixture of various laser-sensitive components, preferably at least three different colouring agent components. Each of those components, preferably each component of the mixture, can be bleached by means of laser under laser conditions which are respectively specific for each component, preferably that procedure involving a cyan colouring agent which is in the form of a colouring agent which can be bleached with red laser light, a magenta colouring agent which is in the form of a colouring agent which can be bleached with green laser light and a yellow colouring agent which is in the form of a colouring agent which can be bleached with blue laser light. Alternatively, instead of such bleachable colouring agents, it is also possible to use colouring agents which are variable in respect of colour by means of the laser under laser conditions which are respectively specific for each component, preferably being variable in respect of colour with a sudden colour change.

In particularly preferred embodiments the identification element which is already present in the layer structure is in the form of a diffraction and/or hologram structure, preferably a diffraction and/or hologram structure which is characteristically delimited in its external contour. Advantageously the structure in question can be in the form of a line, for example a wavy line, in particular in the form of a group of a plurality of mutually juxtaposed lines. Particular embodiments provide that the structure in question is in the nature of a guilloche pattern or a guilloche pattern is contained in the diffraction or hologram structure. In addition there are also embodiments in which the identification element already present in the layer structure is provided additionally or alternatively to the diffraction and/or hologram structure in the form of printing or the like.

Particularly easy monitoring of authenticity is afforded in the case of configurations in which the laser-induced marking and the associated identification element already present in the layer structure prior to the laser treatment are arranged in plan view on to the plane of the layer in mutually accurate register relationship, preferably in directly mutually adjoining juxtaposed relationship. Alternatively or in certain other regions the association can also be such that the laser-induced marking and the other identification element are arranged overlapping completely or portion-wise in accurate register relationship, preferably in aligned mutually superposed relationship.

Particularly advantageous configurations are those in which the laser-induced marking and the other identification element are each of a line-shaped configuration and in plan view on to the plane of the layer can be optically perceived as a preferably continuously extending line which is composed in accurate fitting relationship, the two line portions therefore optically detectably continuing each other. There are also embodiments in which the laser-induced marking and the other identification element are arranged relative to a notional or actually present common alignment line, in particular if the laser-induced marking with the other identification element is in the form of a common sequence of letters or numbers in the nature of an identification word or a multi-digit identification number. To enhance the forgery-proof nature it is possible in particular for the laser-induced marking to be additionally in the form of microscript. Such configurations are difficult to forge because microscript can be produced by printing technology only at a high level of technical complication and expenditure and document-specific information (for example the name of the identity card holder and so forth) can be repeated in the personalisation procedure. The laser-induced microscript can be multi-coloured, preferably with a suitable colour pattern.

A particularly high level of forgery-proofness is also afforded with configurations in which the laser-induced marking and the associated other identification element are provided in guilloche patterns. Advantageously, those guilloche patterns also fit together in accurate relationship so that in plan view on to the plane of the layer it is possible optically to see an accurately fitting composite guilloche structure.

Further embodiments provide that the laser-induced marking and the identification element already previously present in the layer structure are each in the form of a surface field or area. Both the laser-induced markings and also the other identification element can each be in the form of respective alternatingly mutually adjoining surface areas. The mutually adjoining areas are preferably of an optically perceptibly different structure, for example by virtue of being of a different colour or involving a different structure, for example as a preferably flat reflection region or in the form of a diffractive and/or holographic structure. The surface areas already present in the layer structure prior to the laser treatment can be provided in a reflection layer, for example alternately as a flat reflection layer and as a diffraction structure. They are preferably arranged over the laser-induced surface areas, as viewed from the exterior. The converse arrangement is however also possible in some configurations. The laser-induced surface areas are preferably provided with alternate different colours. With different viewing angles that affords different optical effects which cannot be produced by the sole use of the identification elements or the laser-induced markings respectively.

There are configurations in which a laser-induced image constituent is arranged in accurate register relationship with an associated image constituent which is formed for example in or through a background layer or covering layer. It can preferably be provided that a plurality of laser-induced image constituents is arranged in accurate register relationship side-by-side with each other and therefore a laminate image is composed of those many image constituents which are arranged in accurate fitting relationship with each other.

Particular optical effects are achieved with configurations in which it is provided that the laser-induced image constituent is of a colourlessly transparent nature or of a colour-shaded transparent nature and an image constituent associated in a layer disposed therebeneath or thereabove is arranged in aligned or laterally displaced relationship with respect thereto, in a direction perpendicular to the plane of the layer. The layer disposed therebeneath or thereabove may involve the background layer or a covering layer which for example is in the form of a reflection layer with a diffraction structure preferably arranged in a limited region.

In preferred embodiments, in particular if the laminate body is provided in a transfer foil, for example a hot stamping foil or in a laminating foil or in a coating consisting of such a foil, it is preferably provided that, in the laser treatment, exclusively the laser-sensitive layer is changed, more specifically preferably only by selective bleaching or selective change in colour. Advantageously any further layers such as for example protective layers, for example one or more upper protective layers, remain unchanged, that is to say there is no damage done to those layers under the effect of the laser. In configurations which have a reflection layer, the reflection layer is preferably such that, with the laser beam being suitably guided, it can pass therethrough and act on the laser-sensitive layer possibly arranged thereeneath. A particularly good forgery-proof nature is achieved if the laser-sensitive layer or the laser-induced marking, as viewed in a direction on to the laminate body or on to the foil-coated substrate, is arranged beneath the diffraction and/or hologram structure and/or the reflection layer, in which respect it is particularly advantageous if the laser-induced marking is arranged immediately adjoining that superposed structure or layer.

The term reflection layer or reflection area is used to denote a layer or a region which has increased light reflection and/or an increased refractive index. This involves a layer or a region which can be made up of a metal or a metallic compound, for example aluminium, chromium, silver, zinc sulphide, titanium oxide and so forth, while a composition comprising other materials is also possible, for example germanium compounds, silicon compounds and so forth. This may involve a flat, preferably vapour-deposited layer or regions. That layer or those regions can be provided in a coherent and continuous structure or in mutually separate regions. Embodiments are possible in which the reflection property is achieved by suitable particles or the like, for example metallic pigments.

BRIEF DESCRIPTION OF THE DRAWINGS

Preferred embodiments are described in greater detail hereinafter with reference to the accompanying Figures in which:

FIGS. 12 and 13 show perspective views and sectional views corresponding to FIG. 11 of a second and a third embodiment, FIGS. 15a to b show plan views of the embodiment of FIG. 14, FIGS. 16a to d show perspective views corresponding to FIG. 11 of a fifth embodiment, FIG. 19 shows plan views of an eighth embodiment.

DESCRIPTION OF THE PREFERRED EMBODIMENTS

Figure 1:
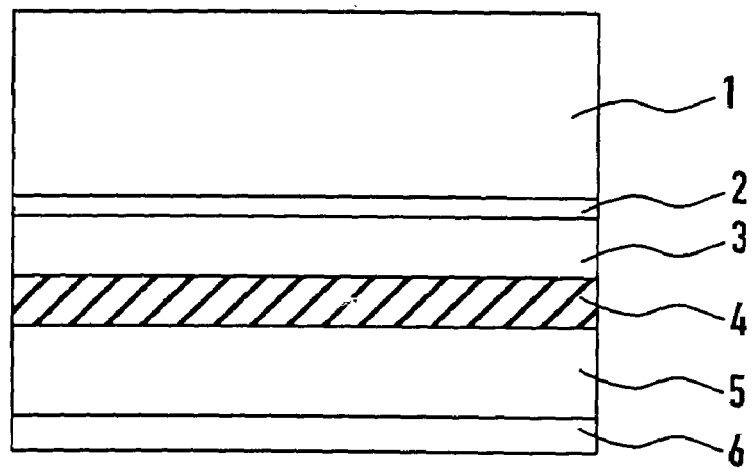
FIGS. 1 to 5 show views in section of various hot stamping foils, each with a laser-sensitive layer.

Hereinafter reference will firstly be made to FIGS. 1 to 10 to describe hot stamping foils and laminating foils, in the layer structure of which a laser-induced individualisation can be produced for the purposes of affording a forgery-proof nature and to provide combinatory visual effects. In connection with these Figures, the basic method steps involved in the laser treatment will also be described, with which the foils, that is to say the laser-sensitive layer, are treated, to produce the individualisation in question. Instead of hot stamping foils it is also possible to use other transfer foils.

Firstly the various foils shown in the Figures will now be described in regard to their layer structure and the material composition of the individual layers.

The foils shown in FIGS. 1 to 5 involve hot stamping foils. The hot stamping foil in FIG. 1 includes a carrier film 1, a release layer 2, a protective layer 3, a laser-sensitive layer 4, a background layer 5 and an adhesive layer 6.

The carrier film 1 preferably involves a polyester film of a thickness of 6 to 100 µm, preferably a thickness of 19 to 38 µm. The layers 2 to 6 are arranged in mutually superposed relationship on that carrier film 1. They are applied in accordance with per se known processes in production of the hot stamping foil.

The release layer 2 is a separating layer. It is preferably in the form of a layer which becomes soft in the production of heat and which, in the operation of applying the hot stamping foil to the substrate, permits detachment of the further layers from the carrier film 1. The release layer 2 is generally of a thickness of at most 1 µm.

The protective layer 3 is in the form of a protective lacquer layer. This involves a transparent lacquer layer, with the function of substantially protecting the free surface of the article decorated with the hot stamping foil, from mechanical damage and chemical effects thereon. The layer thickness is preferably between 1 and 2 µm.

The laser-sensitive layer 4 is in the form of a so-called first coloured lacquer layer. This involves a lacquer layer which is coloured by pigments and/or provided with other colouring systems or colouring agents, of a thickness of preferably 3 to 10 µm. The pigments or the other colouring systems or colouring agents of that coloured lacquer layer can be selectively bleached and/or changed to another colour by means of a laser beam whose wavelength is preferably in the visible range. Preferably the pigment concentration of that lacquer layer 4 is between 3 and 15% in relation to solids. The binding agent system of that lacquer layer 4 may not be optically varied by the action of the laser so that at the irradiated locations, the result produced is only a coloured contrast marking without damage to the foil. The foil is not perceptibly damaged either at the surface or in the interior thereof.

The background layer 5 is in the form of a so-called second coloured lacquer layer. This layer is of a different colour from the laser-sensitive layer 4. The layer 5 is for example white or ivory coloured if the laser-sensitive layer 4 is black or grey. The layer 5 serves primarily as a light backup layer for the colours produced in the laser-sensitive layer 4 by laser radiation. The thickness of the layer 5 is preferably 15 to 20 µm.

There is the possibility of providing the background layer 5—just like the laser-sensitive layer 4—not over the entire surface area of the hot stamping foil and thus not over the entire surface to be decorated, in the same coloration. On the contrary the layers 4 and 5 can be composed individually—and thus also differently—of regions of different colours.

The adhesive layer 6 is an adhesive layer which is known and conventional per se in relation to transfer foils or hot stamping foils, of a thickness of about 1 to 10 µm, wherein the adhesive layer for a hot stamping foil is of such a composition that it only becomes sticky when subjected to a corresponding action of heat. The layers 2 to 6 can be produced in accordance with the following compositions:

| Release layer 2 (separating layer): | |
|---|---|
| Toluene | 99.5 parts |
| Ester wax (dropping point 90° C.) | 0.5 parts |
| Protective layer 3 (protective lacquer layer): | |
| Methylethylketone | 61.0 parts |
| Diacetone alcohol | 9.0 parts |
| Methylmethacrylate (Tg = 122° C.) | 18.0 parts |
| Polyethylene dispersion (23% in xylol) (softening point 140° C.) | 7.5 parts |
| High-molecular dispersing additive (40%, amino number 20) | 0.5 parts |
| Extender (aluminium silicate) | 4.0 parts |
| Laser-sensitive layer 4 (first coloured lacquer layer): | |
| Methylethylketone | 34.0 parts |
| Toluene | 26.0 parts |
| Ethylacetate | 13.8 parts |
| Cellulose nitrate (low-viscosity, 65% in alcohol) | 20.0 parts |
| Linear polyurethane (Fp. >200 ° C.) | 3.5 parts |
| High-molecular dispersing additive (50%, amino number 20) | 2.0 parts |
| e.g.: Pigment Blue 15:4 | 0.5 part |
| Pigment Red 57:1 | 0.5 part |
| Pigment Yellow 15:5 | 0.5 part |
| Background layer 5 (second coloured lacquer layer): | |
| Methylethylketone | 40.0 parts |
| Toluene | 22.0 parts |
| Ethylene vinylacetate terpolymer (Fp. = 60° C.) | 2.5 parts |
| Polyvinylchloride (Tg: 89° C.) | 5.5 parts |
| Polyvinylchloride (Tg: 40° C.) | 3.0 parts |
| Dispersing additive (50%, acid number 51) | 1.0 part |
| Titanium dioxide (d = 3.8-4.2 g/cm$^3$) | 26.0 parts |
| Adhesive layer 6: | |
| Methylethylketone | 55.0 parts |
| Toluene | 12.5 parts |
| Ethanol | 3.5 parts |
| Polyvinylacetate (softening point 80° C.) | 6.0 parts |
| Butyl-/methylmethacrylate (Tg: 80° C.) | 8.0 parts |
| Ethylmethacrylate resin (Tg: 63° C.) | 3.0 parts |
| Methacrylate copolymers (Tg: 80° C.) | 5.0 parts |
| Unsaturated polyester resin (softening point 103° C.) | 3.5 parts |
| Silicon dioxide | 3.5 parts |

The transfer foils—in the specific case here hot stamping foils—are respectively applied preferably in conventional manner to a substrate, more specifically in such a way that the adhesive layer 6 is towards the substrate surface. In the hot stamping operation the adhesive layer 6 then forms an adhesive join to the substrate surface. The carrier film 1 is then pulled off—after softening of the release layer 2 under the effect of heat in the hot stamping operation. With the hot stamping foil applied to the substrate surface in that way the protective layer 3 then forms the upper surface of the stamping foil, which faces away from the substrate.

Figure 2:
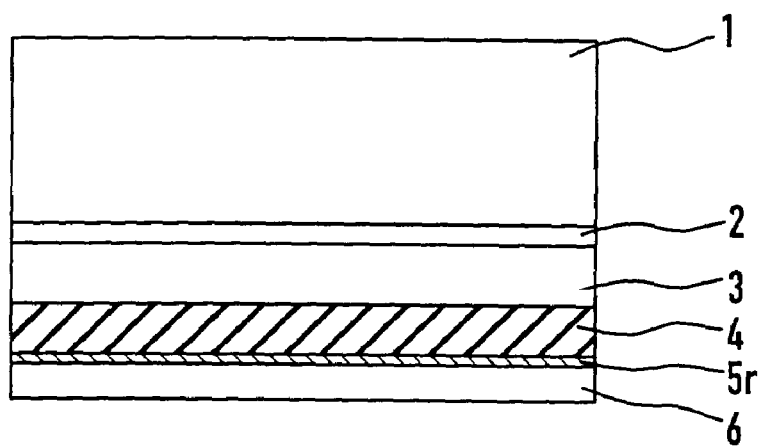
Figure 3:
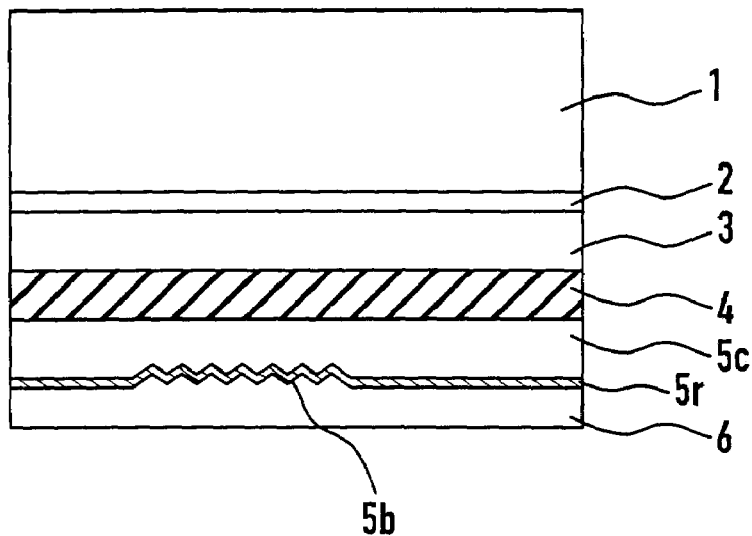
Figure 4:
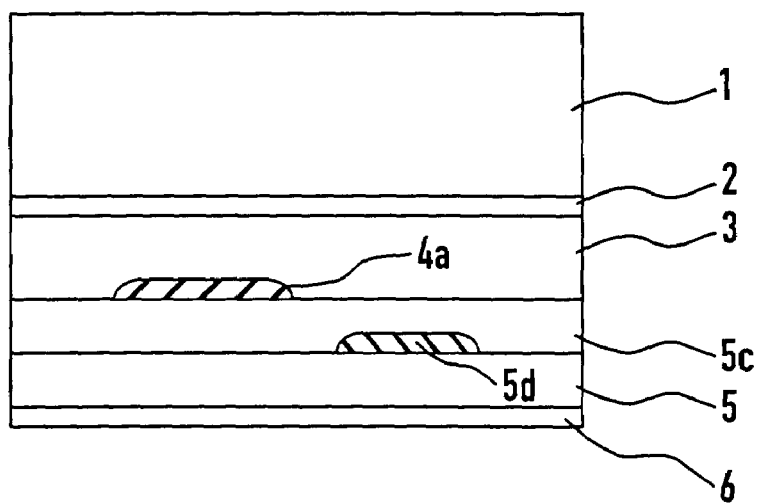

The hot stamping foils shown in FIGS. 2 to 4 have a background layer which is different from the foil in FIG. 1.

In the embodiment in FIG. 2 the background layer is in the form of a reflection layer 5r. In a special case the reflection layer is in the form of a metallic reflection layer. The reflection layer can be partly transparent or transparent, for certain spectral ranges. It may have a higher refractive index than the other layers and therefore increased light reflection. In the case of the example in FIG. 3, there is a layer 5c as an additional lacquer layer which is preferably transparent. There is further provided a reflection layer 5r which in a region-wise manner has a diffraction or hologram structure 5b. In the embodiment in FIG. 3 that structure 5b is in the form of a constituent part of the lacquer layer 5c and the adhesive layer 6 and the layer therebetween. Alternatively or in addition a diffraction structure can also be in the form of a constituent part of the lacquer layer 5c and/or the laser-sensitive coloured lacquer layer 4 and/or the adhesive layer 6. In those cases the diffraction structure may be of a region-wise nature as illustrated but it may also be in the form of a continuous layer.

In the example shown in FIG. 4 the background layer 5c is a printed image 5d in a delimited region and a delimited laser-sensitive region 4a is arranged in the laser-sensitive layer in laterally displaced relationship with respect to the image 5d.

Figure 5:
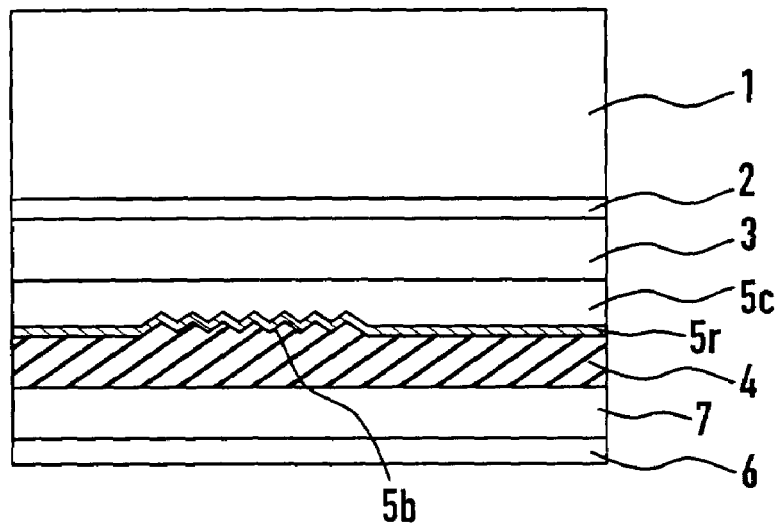

FIG. 5 shows a hot stamping foil with a modified layer structure. The layer structure is similar to that in FIG. 3, but the sequence of the layers is modified, more specifically in such a way that the laser-sensitive layer 4 is arranged on the side of the reflection layer 5, which is towards the substrate. The layers are in the following sequence on each other: a carrier film 1, a release layer 2, a protective layer 3, an intermediate layer 5c, a reflection layer S, a laser-sensitive layer 4, a background layer 7 and an adhesive layer 6. A diffraction structure 5b is provided in the mutually adjoining regions of the laser-sensitive layer 4, reflection layer 5 and intermediate layer 5c. The diffraction structure can be in the form of a diffraction grating. Alternatively the structure 5b can also be in the form of a hologram structure. In the illustrated embodiment in FIG. 5 the diffraction structure 5b is produced upon manufacture of the foil by a procedure whereby the diffraction structure is firstly embossed into the intermediate layer 5c and then the reflection layer 5r is applied for example by vapour deposition. The reflection layer 5 is in the form of a smooth reflection layer 5r in the portions outside the diffraction structure. It is preferably of a layer thickness of <1 mm. It is partly transparent or transparent in given viewing angles, at least for certain spectral ranges. After application of the reflection layer 5r the laser-sensitive layer 4 is applied; The diffraction structure 5b produced in that way is provided in the mutually directly adjoining regions of the layers 5c and 4. When the diffraction structure is viewed, varying optical effects are produced, in dependence on the illumination and viewing angle.

In the case of the foil in FIG. 5a the layers are in the following sequence: carrier layer 1, release layer 2, protective layer 3, laser-sensitive layer 4, reflection layer 5r, laser-sensitive layer 4, additional lacquer layer 7 and adhesive layer 6. The laser-sensitive layers 4 on both sides of the reflection layer 5r can be identical, that is to say the reflection layer is then arranged in that overall laser-sensitive layer. The laser-sensitive layers however can also be provided differently. A diffraction structure 5b is provided in mutually adjoining regions of the laser-sensitive layers 4 and the reflection layer 5r. Alternatively the structure 5b can also be in the form of a hologram structure. In this embodiment enhanced forgery-proof qualities are afforded by virtue of the fact that two laser-sensitive layers adjoin the diffraction or hologram structure, which layers can be the same or different. The lacquer layer 7 which is optional is in this case in the form of a transparent layer or a light backup layer. Alternatively it is also possible for the lacquer layer 7 and the adhesive layer 6 to be omitted and for the second laser-sensitive layer 4 shown in FIG. 5a under the reflection layer 5r to be in the form of a laser-sensitive adhesive layer.

In the foil shown in FIG. 5b the layers are in the following sequence: carrier film 1, release layer 2, laser-sensitive layer 4, additional lacquer layer 5c, reflection layer 5r and adhesive layer 6. The layers 5c and 6 can be made from identical material or different materials. In this embodiment the laser-sensitive layer 4 is a protective lacquer layer which is of a laser-sensitive nature by virtue of the fact that it contains the comparable pigments in question. A diffraction structure can be provided in the mutually adjoining regions of the additional lacquer layer 5c, the reflection layer 5r and the adhesive layer 6. It can be in the form of a diffraction grating. Alternatively the structure 5b can also be in the form of a hologram structure.

After the transfer foil, in the present case the stamping foil, has been applied to the substrate, the laser treatment is effected to produce transparent and/or coloured markings in the laser-sensitive layer 4. In order to produce a given marking, preferably a colour marking, at a given position in the laser-sensitive layer 4, that location is irradiated with laser radiation.

In the case of laser treatment of a foil with the layer structure shown in FIG. 5 laser irradiation is effected through the reflection layer including the diffractive structure 5b. The laser beam is preferably directed from above perpendicularly on to the plane of the foil the reflection layer 5r is transmissive in respect of the laser radiation in particular in the situation involving perpendicular irradiation. The grating or hologram structure 5b of the layer which in the rest of the region forms the reflection layer 5r is transmissive in respect of the laser radiation, in which case however the radiation can be reflected more or less also and in part at the diffraction structure. The laser-sensitive layer 4 arranged below the layer forming the reflection layer 5r in the rest of the region, still within the diffraction structure 5b and therebeneath, is altered by the effect of the laser insofar as a change in colour takes place at the given location due to bleaching or a selective colour change.

The bleaching operation as takes place in the illustrated embodiments in the respective laser-sensitive layer is described hereinafter.

In the bleaching operation a blue or green or red colour marking is produced in a first step, by that location being irradiated with a given laser wavelength with which a given pigment component is bleached. To produce the colour blue the yellow pigment component has to be bleached. Blue laser light is used for that purpose. A given minimum intensity is required for the bleaching operation. In addition a certain pulse duration is not to be exceeded. To produce a green marking in the first step the magenta pigment component has to be bleached. Green laser light is used for that purpose. In order to produce a red colour marking in the first step the cyan pigment component has to be bleached. Red laser light is used for that purpose.

In order at that location to produce a colour marking of the colour cyan or magenta or yellow, that location is subjected to laser treatment in a second step, more specifically using a laser wavelength with which one of the pigment components which is not yet bleached at that location is bleached. If in the first step a blue colour marking has been produced, at that location the cyan pigment component and the magenta pigment component are unbleached. To produce the colour cyan at that location the magenta pigment component has to be bleached in this second step. That is effected with green laser light. That therefore gives a cyan-coloured marking at that location. If, instead of that cyan-coloured marking, a magenta-coloured marking is to be produced in the second step, the blue colour marking produced in the first step has to be treated with red laser light. That causes bleaching of the cyan pigment at that location so that therefore the magenta pigment remains unbleached at that location. That therefore gives the magenta-coloured marking at that location.

In a corresponding manner, a cyan-coloured marking or a yellow-coloured marking can be produced from a green coloured marking which was produced in the first step and which is formed from unbleached cyan pigment and yellow pigment which has remained there, more specifically by virtue of treatment with blue laser light and red laser light respectively.

In a corresponding manner a red colour marking produced in the first step can be converted in the second step into a yellow or magenta-coloured marking, more specifically by laser treatment in the second step with green laser light or blue laser light respectively.

In order to obtain a transparent location at the location treated in the first and second steps, that is to say to obtain a white location if the background layer 5 is white, then in a third step that location has to be treated with a laser beam whose wavelength is so adjusted that the pigment component which has remained unbleached at that location after the second step is bleached, that is to say the yellow colour marking has to be bleached with blue laser light, the magenta-coloured marking with green light and the cyan-coloured marking with red laser light.

In the same manner further adjacent locations are then treated in the laser-sensitive layer 4 to produce further colour markings in the layer 4 of the stamping foil. It is possible in that way to produce a full-colour image.

Laser treatment can also be used to produce colour markings or a full-colour image in the colouring agent or agents in the laser-sensitive layer, by virtue of a colour reversal effect. The laser treatment can be effected in a corresponding manner with successive method steps. Pigments can be considered for use as colouring agents, that is to say colouring substances. The pigments are generally insoluble and generally involve inorganic substances. However generally soluble, organic colouring agents can also be used as the colouring agent. The colour reversal effect takes place in each case at specific laser conditions which are then used in the laser treatment in the individual steps.

The laser treatment of the transfer or stamping foil to produce the colour markings can alternatively also be effected before application of the foil, more specifically in particular if the protective layer 3 and/or the intermediate layer 5c is in the form of a layer which is not transparent in relation to laser radiation or a layer which is not transparent in relation to laser radiation in the given wavelength range, or if an additional UV-absorbent protective layer is provided. The laser treatment is then effected prior to application of the foil by a procedure whereby the laser beam is directed on to the rear side of the foil, that is to say on to the background layer 5 or the adhesive layer 6, and thus the laser-sensitive layer 4 is treated from the other side in order to produce the colour markings therein, in the same manner.

In these uses, the background layer 5 and the adhesive layer 6 are transparent or at least partly transparent for the laser radiation in question.

Colour markings can also be produced in laminating foils in a corresponding fashion. Such laminating foils are illustrated in FIGS. 6 to 10. The laminating foil in FIG. 6 includes a so-called overlay foil 30, an optional intermediate layer 31, a laser-sensitive layer 40, an intermediate layer 50 which forms a background layer and which is also optional and an adhesive layer 60 which is also optional. In the laminating procedure the laminating foil is applied to the substrate with the adhesive layer 60 towards the substrate surface.

An adhesive join is formed with the substrate surface by way of the adhesive layer 60. The overlay foil 30 then forms the upper protective layer whose surface remote from the substrate forms the outer surface of the foil. The overlay foil 30 therefore remains applied there after application of the laminating foil. It corresponds to the protective layer 3 of the stamping foil in FIG. 1. The laser-sensitive layer 40 corresponds to the laser-sensitive layer 4, that is to say the first lacquer layer 4 of the stamping foil in FIG. 1. The intermediate layer 50 corresponds to the background layer 5, that is to say the second lacquer layer 5 of the stamping foil in FIG. 1. The adhesive layer 60 corresponds to the adhesive layer 6 of the stamping foil in FIG. 1. The laminating foils in FIGS. 7 and 8 represent modifications of the laminating foil in FIG. 6, in which the background layer is modified in a corresponding manner to the background layer in the hot stamping foils in FIGS. 2 and 3.

Figure 6:
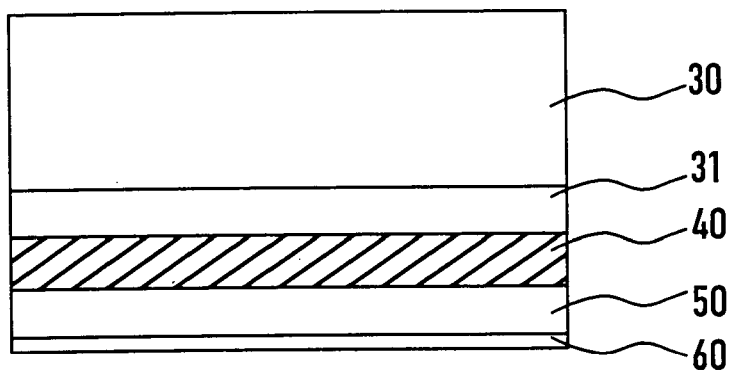
FIGS. 6 to 10 show views in section of various laminating foils, each with a laser-sensitive layer.
Figure 7:
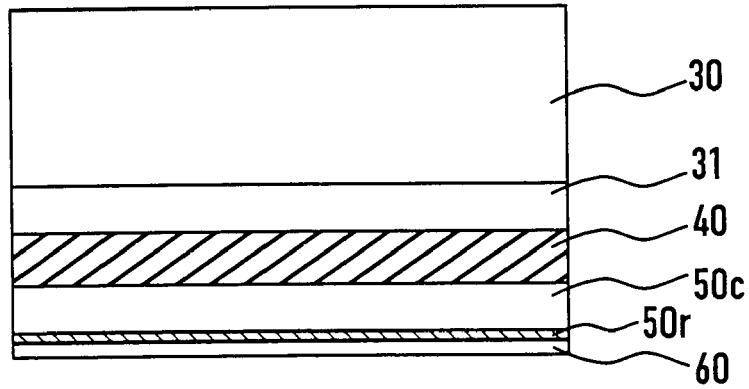
Figure 8:
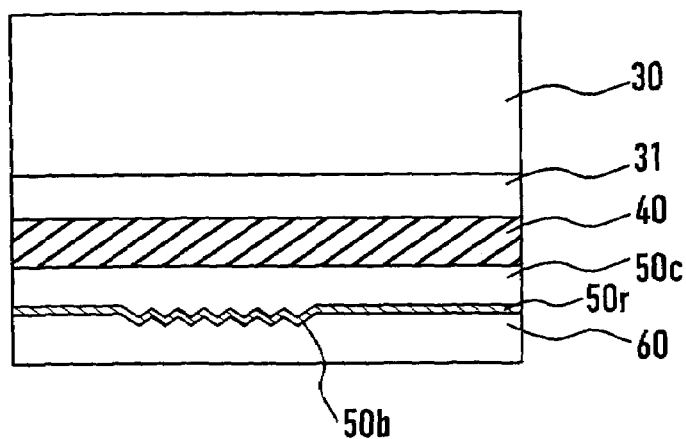
Figure 9:
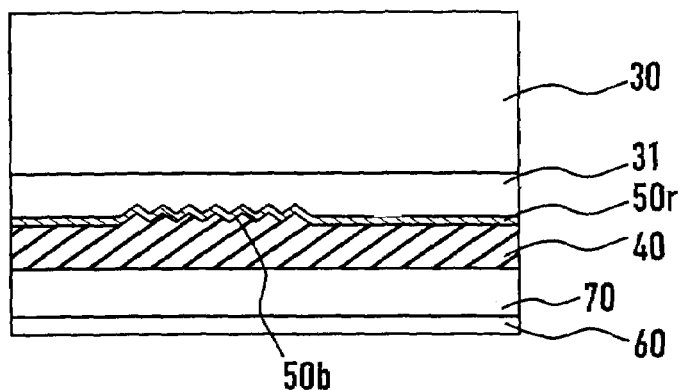

The laminating foil in FIG. 9 involves a layer structure with a sequence of the mutually superposed layers, which is modified in relation to FIGS. 6 to 8. The sequence of layers corresponds to the structure of the hot stamping foil in FIG. 5. In this case the layer 70 is an optional background layer.

Figure 5A:
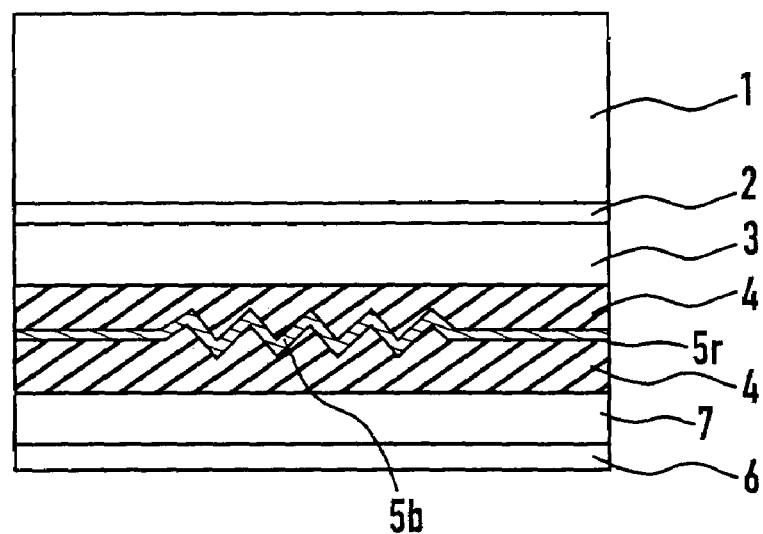
Figure 5B:
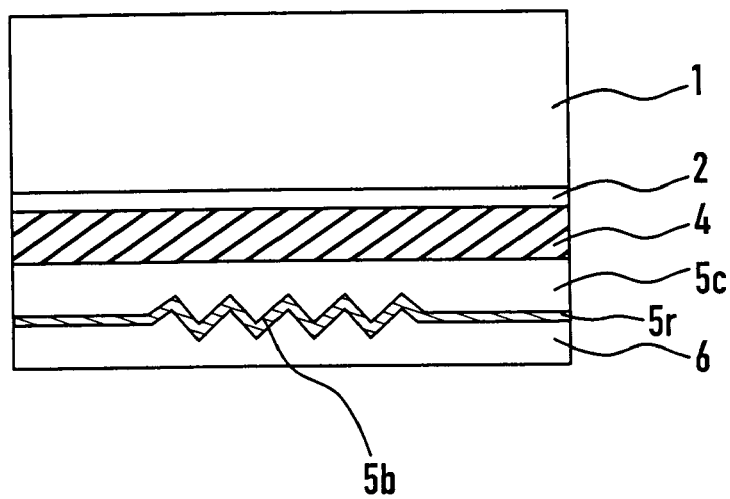
Figure 9A:
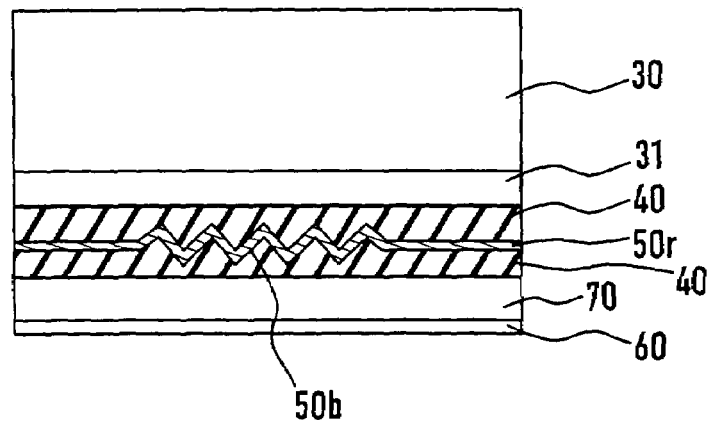

FIG. 9a shows an embodiment which is modified in relation to that shown in FIG. 9, with a sequence of layers corresponding to the structure of the hot stamping foil in FIG. 5a.

Figure 10:
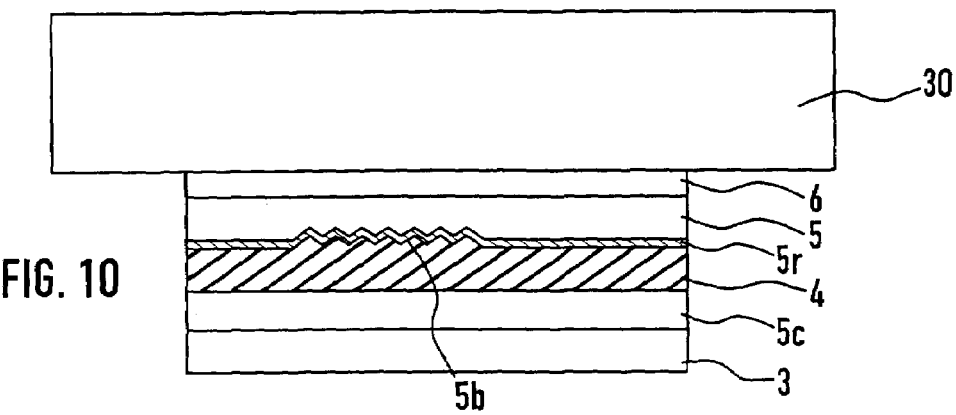

The laminating foil in FIG. 10 represents a modification of the laminating foil in FIG. 9. In this embodiment the overlay foil 30 is provided with a hot stamping foil applied thereto. That hot stamping foil which is applied there replaces the layers 31, 50 and 50r, 40, 70 and 60, which are provided in the laminating foil in FIG. 9, by the corresponding layers of the hot stamping foil. In the case of the hot stamping foil used to produce that laminating foil, unlike the stamping foil in FIG. 5 the reflection layer 5r and the laser-sensitive layer 4 are arranged in the reversed sequence so that, in the laminating foil in FIG. 10, the reflection layer 5r is now arranged on the side of the laser-sensitive layer 4 remote from the substrate, in a corresponding manner to the laminating foil in FIG. 9. In conformity with the other illustrated embodiments the diffraction structure 5b in the laminating foil shown in FIG. 10 is also provided in the mutually adjoining regions of the layers 4 and 5. In this case the lacquer layer 5 is in the form of a transparent layer.

Figure 10A:
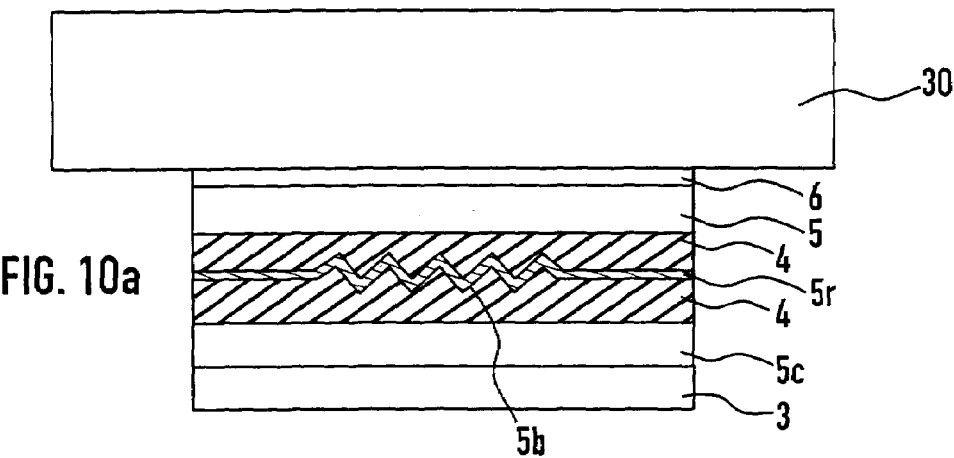

The laminating foil in FIG. 10a is of a similar structure to the laminating foil in FIG. 10. In the embodiment of FIG. 10a however the overlay foil 30 is provided with a hot stamping foil which is applied thereto and which is of a similar configuration to the hot stamping foil of the embodiment of FIG. 5a. The hot stamping foil applied to the overlay foil 30 replaces the layers 31, 40, 50, 50r, 40, 70 and 60 provided in the laminating foil in FIG. 9a, by the corresponding layers of the hot stamping foil. The laminating foil in FIG. 10a involves a series of layers in the following sequence: overlay foil 30, adhesive layer 6, optional lacquer layer 5, laser-sensitive layer 4, reflection layer 5r, laser-sensitive layer 4, additional lacquer layer 5c and protective layer 3. The laser-sensitive layers 4 on both sides of the reflection layer 5r can be identical, that is to say the reflection layer 5r is then arranged in that overall laser-sensitive layer. The laser-sensitive layers 4 however may also be of different natures. In this case the lacquer layer 5 is in the form of a transparent layer or a light backup layer.

Figure 10B:
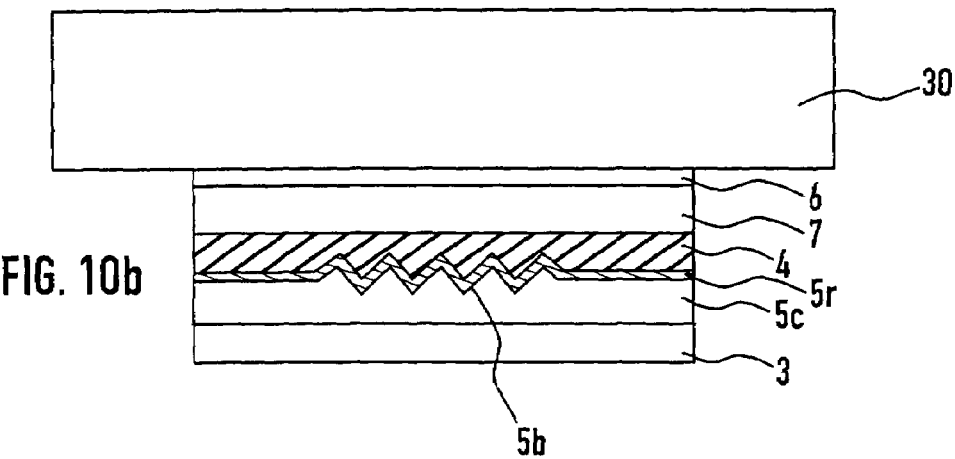
Figure 11A:
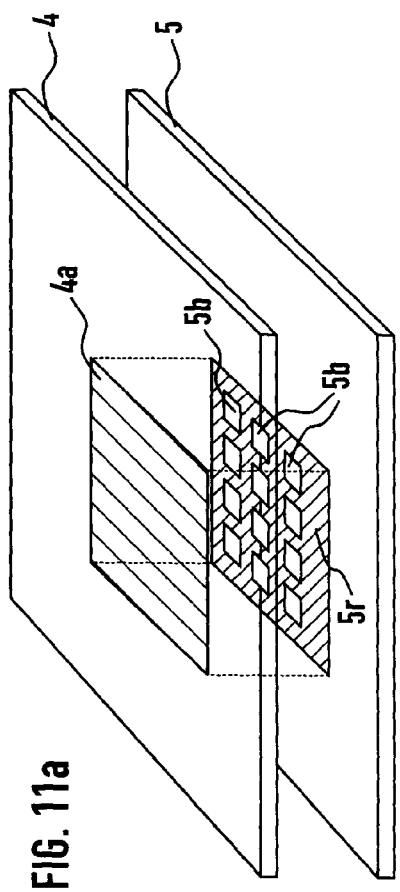
FIGS. 11a to d show perspective views (a and c) and sectional views (b and d) of a first embodiment of laminate images produced by laser treatment, wherein FIGS. a and b each show the configuration in the region of the laser-sensitive layer and the second layer prior to the laser treatment and FIGS. c and d respectively show them after the laser treatment.
Figure 11B:
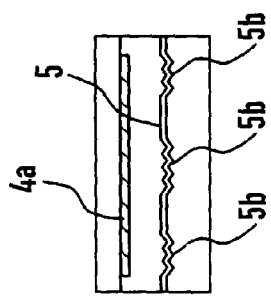
Figure 11C:
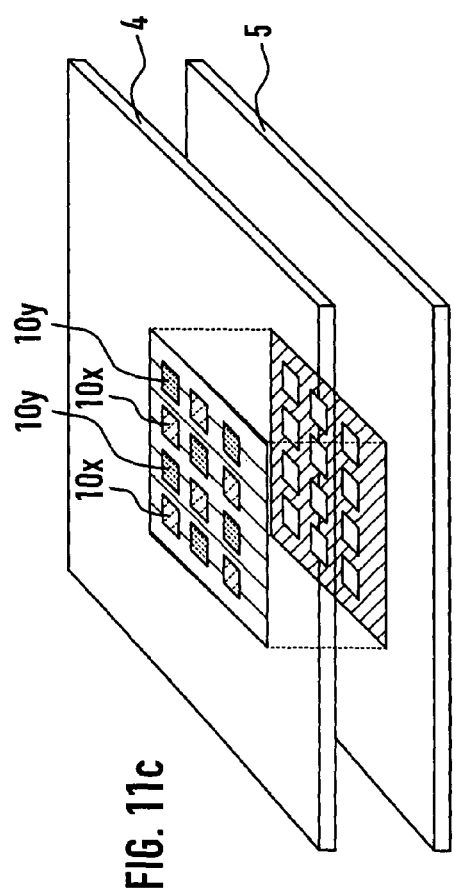
Figure 11D:
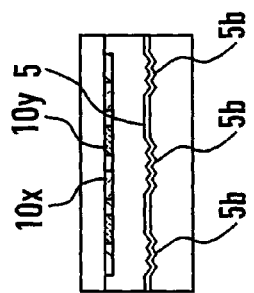
Figure 12A:
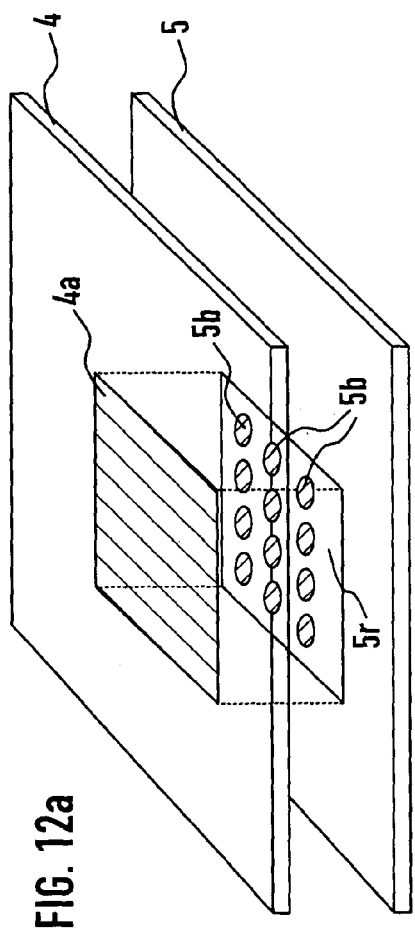
Figure 12B:
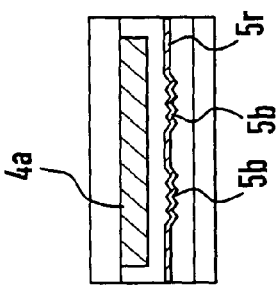
Figure 12C:
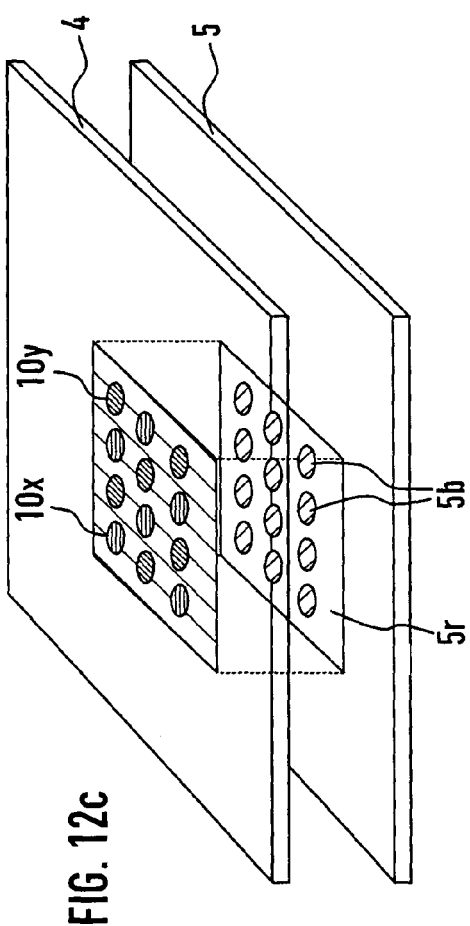
Figure 12D:
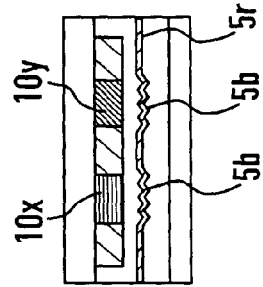
Figure 14B:
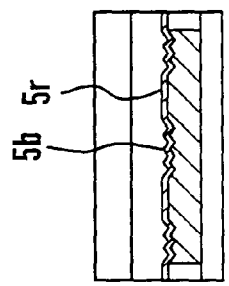
FIGS. 14a to d show perspective views and sectional views corresponding to FIG. 11 of a fourth embodiment.
Figure 14D:
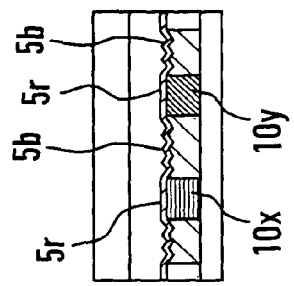
Figure 14A:
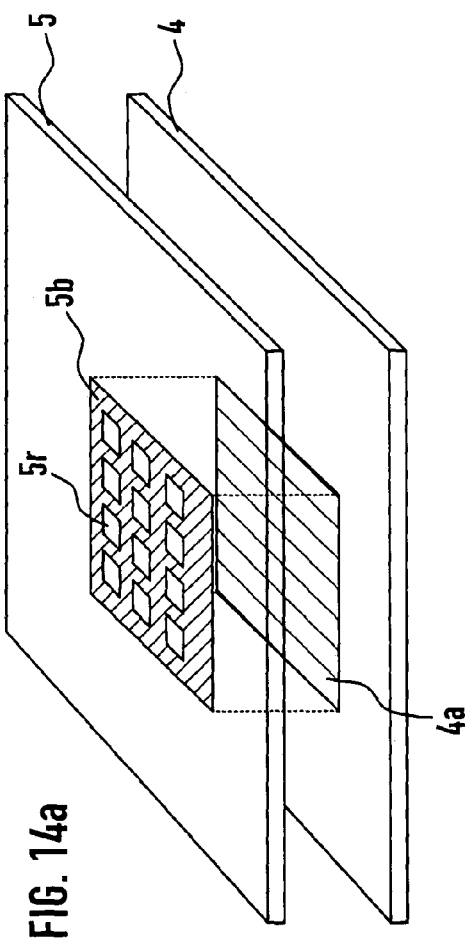
Figure 14C:
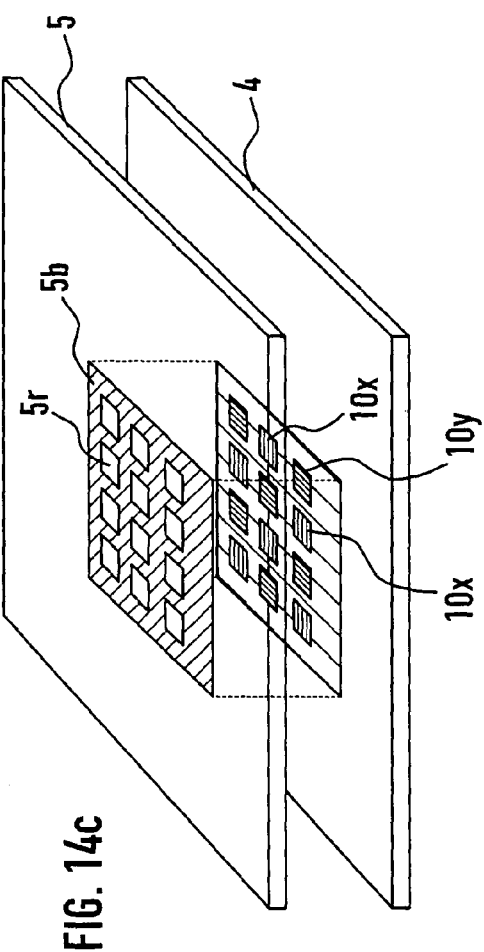
Figure 16A:
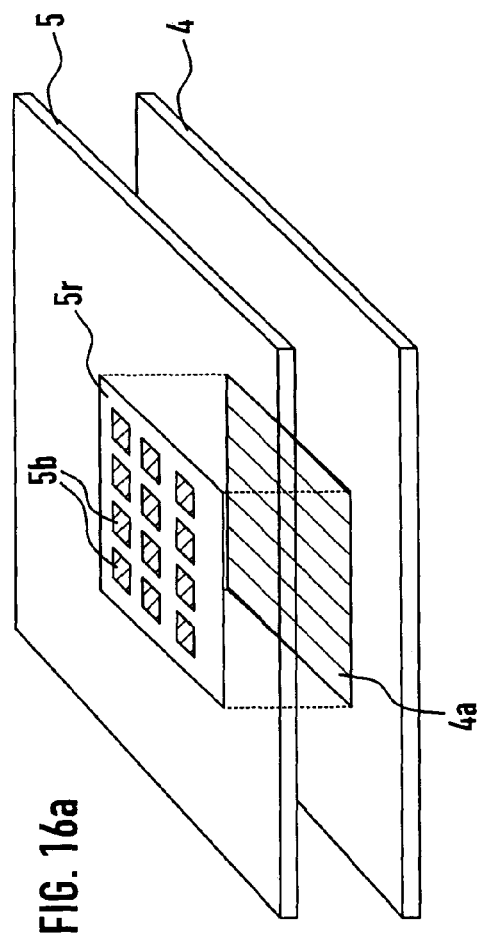
Figure 16B:
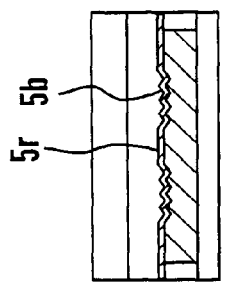
Figure 16C:
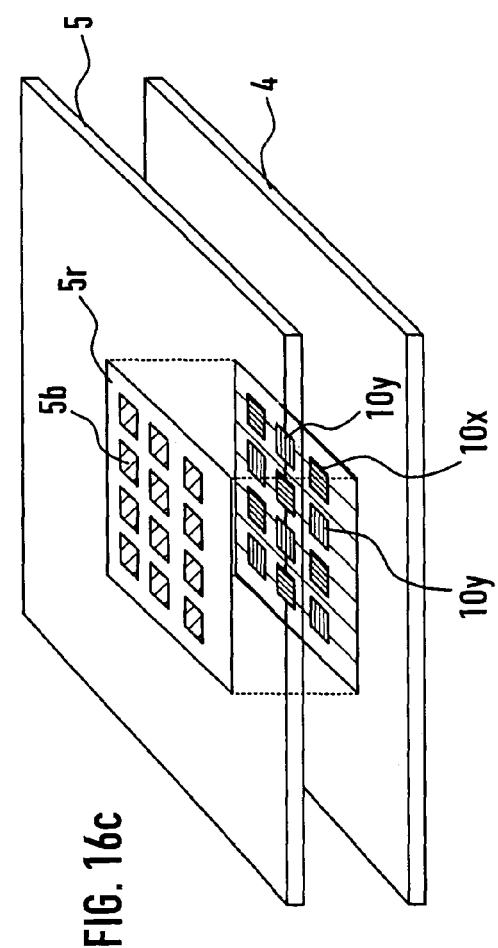
Figure 16D:
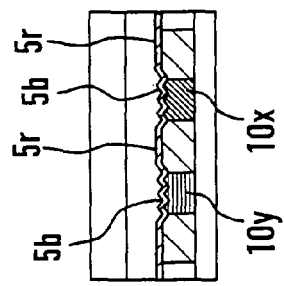

The laminating foil in FIG. 10b represents an embodiment in which a hot stamping foil is also applied to the overlay foil 30. That applied hot stamping foil is of a similar configuration to the foil in FIG. 5. It replaces the layers 31, 40, 50 and 50r, 40, 70 and 60 respectively provided in the laminating foil in FIG. 9a, by the layers of the hot stamping foil. The laminating foil in FIG. 10b has a series of layers in the following sequence: overlay foil 30, adhesive layer 6, optional lacquer layer 7, laser-sensitive layer 4, reflection layer 5r, additional lacquer layer 5c and protective layer 3. The lacquer layer 7 in this case is in the form of a transparent layer or a light backup layer.

Laser treatment of the laminating foil is effected in a corresponding manner as described in relation to the stamping foil, that is to say by suitable successive bleaching or laser-sensitive colour change of the colouring agents contained in the laser-sensitive layer, that is to say pigment components or other laser-sensitive colouring agents.

Preferred embodiments are described hereinafter with reference to FIGS. 11 to 16. The illustrated embodiments preferably use transfer foils of a structure corresponding to FIGS. 1 to 5 or laminating foils of a structure corresponding to FIGS. 6 to 10. FIGS. 11 and 12 only show the layer structure in highly diagrammatic form, in each case showing only an upper layer and a lower layer. Shown is a laser-sensitive layer 4 and a further layer which is arranged parallel thereto and which is in the form of a reflection layer 5r and has in a region-wise manner a diffraction structure. The diffraction structure 5b is provided in the layers adjoining the grating structure.

The embodiment illustrated in FIGS. 11a to d takes as its basic starting point a foil in which the laser-sensitive layer 4 is more or less covered green or as a different colour in the region 4a. In the subjacent region the background layer 5 has a reflection layer with a diffraction structure 5b. The background layer 5 can be in the form of a metal layer which can be formed directly under the laser-sensitive layer, preferably being vapour-deposited thereon. Separate markings in the form of alternating, mutually spaced square fields or areas 10x and 10y are produced by laser radiation in the laser-sensitive layer 4a in accurate positional relationship. Suitable laser treatment under different conditions provides that the areas 10x are produced blue, preferably cyan and the areas 10y are yellow. The region around the areas 10x, 10y is not subjected to laser treatment and remains in its original colour, that is to say for example green. By virtue of the laser beam being guided in accurate positional relationship, it is possible for the areas 10x, 10y to be produced in accurate positional relationship with respect to the diffractive regions. The areas 10x, 10y are more or less transparent so that, by virtue of light diffraction at the diffractive structures 5b, a play of colours is produced, in dependence on the possibly superimposed colours and the wavelength-dependent reflection of the irradiated light. By virtue of the fact that the background layer 5 has alternate diffractive areas 5b—arranged in accurately fitting relationship with respect to the laser-induced areas 10x, 10y—and metallically reflectively appearing regions, varying image impressions are afforded, in conjunction with the surfaces coloured by laser irradiation, in dependence on the illumination and viewing angle.

In a particular configuration of the embodiment shown in FIG. 11, it can be provided that the metal layer is in the form of a reflection layer only in separate individual regions 5r and the whole of the rest of the region is in the form of a grating structure. The laser-sensitive layer 4 can be irradiated by the action of a laser in such a way that alternate areas 10x, 10b are bleached differently, that is to say different colours are produced. The areas 10x, 10y forming the laser-induced colour markings can be so arranged that they are disposed in alignment over the reflection areas 5a, considered in a direction perpendicular to the plane of the layer. In that case varying optical effects are produced, depending on the respective illumination and viewing angle.

In a modified embodiment shown in FIG. 12 round areas 10x, 10y are produced in an alternate sequence in different colours in the laser-sensitive layer 4 by laser-sensitive bleaching. They are arranged in accurately positional relationship, considered perpendicularly with respect to the plane of the layer, in aligned relationship over diffraction areas 5b which are also of a round contour in plan view. The diffraction areas are provided in a reflection layer 5r which is arranged under the laser-sensitive layer 4, preferably immediately thereunder.

FIG. 13 shows an embodiment which is modified in relation to FIG. 12 in such a way that round flat reflection areas 5r are provided in the diffraction structure 5b and the also round, laser-induced areas 10x, 10y are arranged in accurate positional relationship above the round flat reflection areas 5r.

The embodiment illustrated in FIGS. 14a to d takes as its basic starting point a foil in which the partly transparent reflection layer 5 is disposed over the laser-sensitive layer 4. The layer-sensitive layer 4 is of a more or less covering nature, for example green or of another colour, in the region 4a. The reflection layer 5 has a region-wise diffraction structure 5b, wherein the reflection layer 5 is in the form of a flat layer without a diffraction structure in individual areas 5r which are separated from each other. The reflection layer 5 is applied by vapour deposition directly on the laser-sensitive layer 4. The diffraction structure 5b is provided in the reflection layer and the laser-sensitive layer 4 and extends into the laser-sensitive layer 4.

By laser irradiation through the reflection layer 5 exclusively in the region of the flat reflection areas 5r, with the laser head being guided in accurate positional relationship, separate markings are produced in accurate positional relationship in the laser-sensitive layer 4 disposed therebeneath, the markings being in the form of alternate, mutually spaced square areas 10x and 10y. Those laser-induced markings in the form of the square areas 10x and 10y in the embodiment in FIG. 14 are each in exactly aligned and accurate positional relationship in respect of their size and position under the flat reflection areas 5r of the reflection layer 5. Suitable laser treatment under different conditions provides that the areas 10x and 10y are produced in different colours, for example the areas 10x as cyan and the areas 10y as yellow. The region around the areas 10x, 10y is not subjected to laser treatment and remains in its original colour, that is to say for example green.

By virtue of light diffraction at the diffractive structure 5b in conjunction with the different colours of the areas 10x, 10y, there is a play of colours which is dependent on the kind of illumination and the illumination and viewing angle, in dependence on the light source L. Respective varying image impressions are produced in that case. The diffraction image or the laser-induced colour image becomes alternately visible, for example with a tilting movement of the foil, whereby the illumination angle and/or the viewing angle is altered, as is diagrammatically shown in FIGS. 15a and 15b. In the position in FIG. 15b the areas 5r appear coloured and the diffraction structure is not operative. In contrast, in the position in FIG. 15a the diffraction image is visible and at least in part is superimposed on the coloured areas.

FIG. 16 shows an embodiment which is modified in relation to FIGS. 14 and 15 in such a way that disposed in the reflection layer 5r are diffraction areas 5b which are rectangular in plan and in relation to which the laser-induced areas 10x, 10y are positioned in accurate register relationship.

Figure 17:
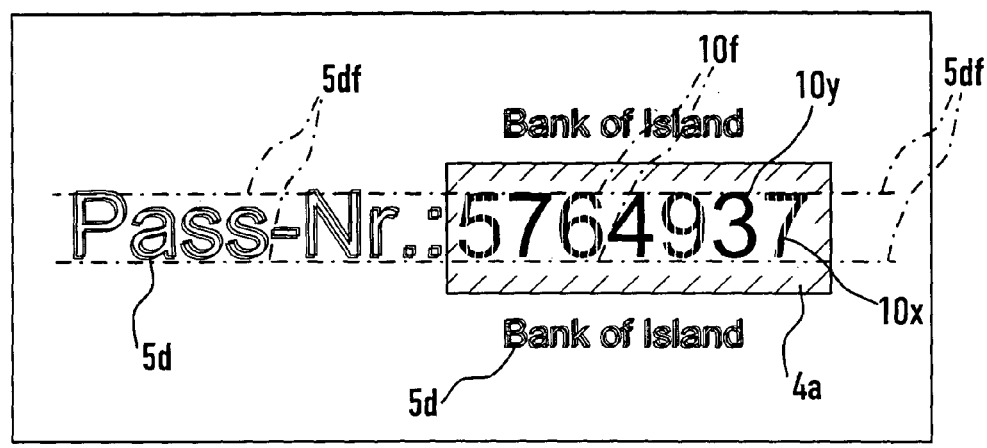
FIGS. 17 and 18 show plan views of a sixth and seventh embodiment of a laminate image.

In the embodiment shown in FIG. 17 the laser-sensitive material in the layer 4 is arranged in a delimited region which is rectangular in contour. The layer 4 is transparent outside the region 4a so that the printed image 5d which is produced in that region in the background layer is visible. The printed image 5d can be produced in a separate background layer of the laminate foil or however also directly on the substrate surface. The printed image 5d is the word image 'Bank of Island' and the word image 'Pass-Nr.', the latter is arranged in accurately fitting relationship between two parallel alignment lines 5df which are also printed on the foil or which are only notional, that is to say only imaginary.

By guiding the mass-less laser beam in accurate positional relationship, it is possible to continue the labelling or marking with a degree of accuracy in the micrometer range in relation to the printed image 5d in the laser-sensitive region 4a by selective bleaching or selective colour change. Therefore, a marking is produced, which continues the two alignment lines 5df of the printed image, which are arranged on both sides of the laser-sensitive area 4a or which exist only notionally as imaginary alignment lines, in the field 4a, in the form of laser-induced alignment lines 10f. Produced between the lines 10f in accurate register relationship is a corresponding laser-induced labelling or marking 10x, 10y, in the illustrated embodiment being the series of digits '5764937'. In this case the individual digits 10x, 10y may be of a varying colours or may each involve a respective colour pattern, for example by bleaching or a colour change which differs in various regions of the digits, or by virtue of a suitable configuration of the printed image which is disposed therebeneath and which possibly appears therethrough. The individual digits 10x, 10y may also be provided in microscript. That affords a high degree of forgery-proofness.

Figure 18:
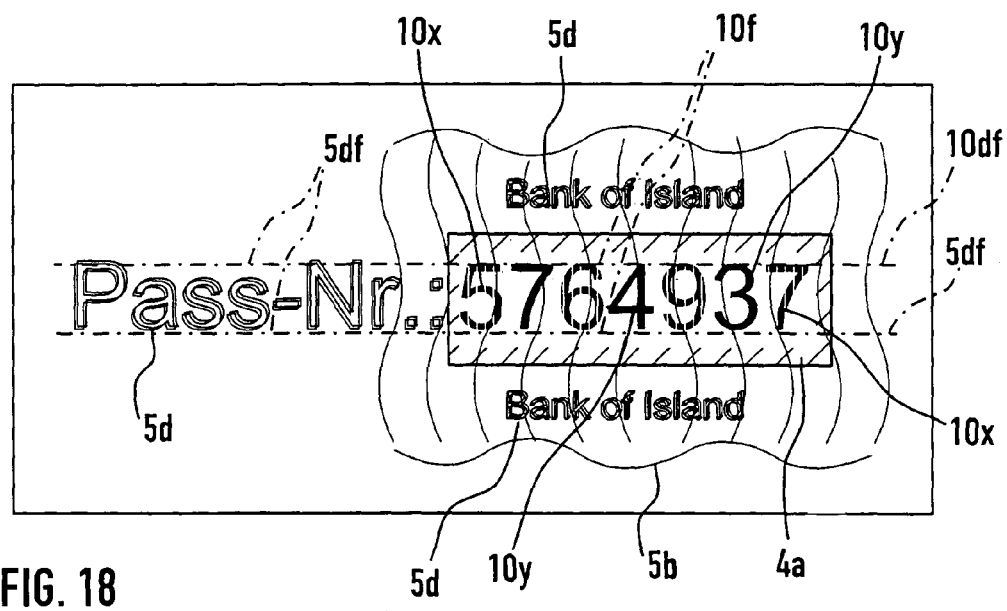

The embodiment in FIG. 18 involves a modification of the embodiment in FIG. 17, with a diffraction structure 5b being arranged over the laser-sensitive layer 4a in order to enhance the forgery-proof nature. The diffraction structure can be provided to be disposed directly on the laser-sensitive layer, for example in a reflection layer which in that delimited region is applied there by vapour deposition or in a reflection layer which covers the entire surface of the embodiment, as illustrated in FIG. 18. In the illustrated embodiment that reflection layer is in the form of a diffraction structure which is also transparent, only in the region which engages over the laser-sensitive area 4a. The laser treatment is effected by laser radiation through the reflection layer or the diffraction structure 5b. In that case the laser-induced markings are produced in accurate register relationship in the same manner as in the embodiment of FIG. 17. By virtue of the fact that the diffraction structure is arranged over the laser-induced marking in the embodiment in FIG. 18 and it is joined directly to the layer in question, which has the markings, that affords an enhanced forgery-proof nature.

The embodiment in FIGS. 19a and b also involves an association of diffractive areas with laser-induced colour areas, in accurate register relationship, wherein this embodiment has a laser-induced image 10y in the form of a full-colour portrait produced as a laser-induced portrait. That laser-induced image is provided in a laser-sensitive layer 4. There are diffraction elements 5b which are in the form of guilloche patterns and are supplemented in accurate register relationship by respective laser-induced coloured guilloche patterns adjoining same. A structure of that kind, consisting of mutually adjoining arcuate regions which are alternately in the form of diffraction guilloche patterns 5b and laser-induced coloured guilloche patterns 10x is arranged in the manner of a closed circle around the laser-induced portrait 10y. In addition, provided in the edge regions of the laser-induced colour image 10y are diffraction guilloche patterns 5b in the form of wavy lines, which extend portion-wise over the laser-induced image 10y.

The layer structure of the embodiment in FIGS. 19a and 19b is similar to the embodiment of FIG. 18. The diffraction structure elements 5b are arranged over the laser-sensitive layer in which the laser-induced image 10y and the laser-induced guilloche patterns 10x are arranged. The diffraction structure elements are preferably arranged in a layer which in the rest of the region forms the reflection layer 5r but they can also be provided exclusively and directly in the laser-sensitive layer 4a.

Laser treatment to produce the laser-induced full-colour image 10y and the coloured guilloche patterns 10x is effected in a corresponding manner to the above-described embodiments.

The invention claimed is:

1. A laminate body, in particular a laminate foil, comprising a laser-sensitive layer and an identification element, which is provided in a second layer and/or in the laser-sensitive layer, wherein the laser-sensitive layer has a marking produced by laser action —hereinafter referred to as laser-induced marking—, which is superposed and positioned in accurate register relationship relative to the identification element.

2. A laminate body according to claim 1, wherein the laser-induced marking and the identification element are provided and associated in mutually supplemental accurate register relationship.

3. A laminate body according to claim 2, wherein the identification element is optically perceptible from the exterior.

4. A laminate body according to claim 1, wherein the laser-induced marking and the identification element are provided overlappingly completely or portion-wise in accurate register relationship.

5. A laminate body according to claim 1, wherein the laser-induced marking is arranged in a layer plane above or under the identification element and/or in the same layer plane as the identification element.

6. A laminate body according to claim 1, wherein the identification element is in the form of a diffraction and/or hologram structure which is characteristically delimited in its external contour and/or a reflection area which is characteristically delimited in its external contour and/or a printed image which is characteristically delimited in its external contour.

7. A laminate body according to claim 1, wherein the laser-induced marking and/or the identification element is or are in line form.

8. A laminate body according to claim 7, wherein the laser-induced marking in the line form and the identification element in line form, in plan view on to the plane of the layer, are optically perceptible as a line which is composed in accurate register relationship and which optionally extends continuously.

9. A laminate body according to claim 1, wherein the laser-induced marking and/or the identification element is or are oriented relative to a notional or concretely visibly present alignment line.

10. A laminate body according to claim 9, wherein the laser-induced marking which is oriented in respect to an alignment line and the identification element which is oriented in respect to an alignment line are oriented in plan view to afford a common notional or concretely visible alignment line which is composed portion-wise of the alignment line of the laser-induced marking and the alignment line of the identification element.

11. A laminate body according to claim 9, wherein the laser-induced marking and/or the identification element is a series of letters or a sequence of digits.

12. A laminate body according to claim 1, wherein the laser-induced marking and/or the identification element is or are in the form of a guilloche pattern.

13. A laminate body according to claim 12, wherein the laser-induced marking in the form of a guilloche pattern and the identification element in the form of a guilloche pattern, in a plan view on to the plane of the layer, is optically perceptible as a joint guilloche pattern which is composed in accurate register relationship.

14. A laminate body according to claim 1, wherein the laser-induced marking and/or the identification element is or are in the form of a surface element, optionally in the form of a row of alternate surface areas.

15. A laminate body according to claim 14, wherein the laser-induced marking which is in the form of alternative surface areas and the identification element which is in the form of alternate surface areas are arranged one above the other in plan view on the plane of the layer, wherein the alternate surface areas of the laser-induced marking are respectively arranged in aligned relationship or constantly displaced with respect to the alternate surface areas of the identification element.

16. A laminate body according to claim 14, wherein the laser-induced marking which is in the form of alternate surface areas and the identification element which is in the form of alternate surface areas when being viewed co-operate with the formation of a combinatory image, optionally at different viewing angles forming different images.

17. A laminate body according to claim 1, wherein the laser-induced marking is in the form of a colored marking.

18. A laminate body according to claim 1, wherein the laser-sensitive material of the laser-sensitive layer is in the form of a mixture of various laser-sensitive components.

19. A laminate body according to claim 18, wherein the mixture is composed of at least three different coloring agent components, wherein each of said components can be bleached by means of laser under laser conditions which are respectively specific for the component and/or the mixture is composed of at least three different color-forming components, wherein each of those components, is variable in color, optionally being variable in color with a sudden color reversal, by means of laser, under laser conditions which are respectively specific for the component.

20. A laminate body according to claim 19, wherein for each of the three components the situation is such that under the laser conditions specific for a component the other components are not substantially bleachable or variable in color.

21. A laminate body according to claim 19, wherein the at least three different coloring agent components are pigment components and wherein the at least three different color-forming components are color-forming coloring agents.

22. A laminate body according to claim 19, wherein the laser-sensitive material has a cyan coloring agent, and/or a magenta coloring agent, and/or a yellow coloring agent.

23. A laminate body according to claim 22, wherein the cyan coloring agent is in the form of a coloring agent bleachable with red laser light and/or the magenta coloring agent is in the form of a coloring agent bleachable with green laser light and/or the yellow coloring agent is in the form of a coloring agent bleachable with blue laser light.

24. A laminate body according to claim 22, wherein the cyan coloring agent is cyan pigment, the magenta coloring agent is magenta pigment, and the yellow coloring agent is yellow pigment.

25. A method for producing a laminate body according to claim 1 to enhance the forgery-proof nature of the laminate body, which has a laser-sensitive layer and an identification element which is arranged in a second layer and/or in a laser-sensitive layer, wherein the laminate body is irradiated by means of a laser in such a way that produced in the laser-sensitive layer is a laser-induced marking which is positioned in accurate register relationship with respect to the position of the identification element.

26. A method according to claim 25, wherein during the laser treatment the position of the laser beam is electronically controlled relative to the foil in dependence on the position of the identification element.

27. A method according to claim 26, wherein the laser comprises a laser head, and wherein control is effected by motional guidance of the laser head.

28. A method according to claim 26, wherein the laser beam is electronically controlled by a procedure whereby during or prior to the laser treatment the actual position of the identification element is detected electronically.

29. A method according to claim 26, wherein the laser beam is electronically controlled by a procedure whereby during or prior to the laser treatment the actual position of the identification element is detected electronically by image processing.

30. A method according to claim 25, wherein laser irradiation is effected through at least one layer of the laminate body.

31. A method according to claim 25, wherein the laser-induced marking is produced by laser-induced bleaching and/or laser-induced sudden color reversal of a coloring agent disposed in the laser-sensitive layer.

32. A method according to claim 25, wherein the laser-induced marking is produced by region-wise removal of the laser-sensitive layer.

33. A method according to claim 25, wherein the laminate body is a laminate foil.

34. A method according to claim 25, wherein laser irradiation is effected through a diffraction and/or hologram structure arranged over the laser-sensitive layer and/or a reflection layer.

35. A laminate body according to claim 1, wherein the identification element is a diffraction and/or hologram structure, a reflection layer or a printed image.

* * * * *

UNITED STATES PATENT AND TRADEMARK OFFICE
CERTIFICATE OF CORRECTION

PATENT NO.         : 7,255,911 B2
APPLICATION NO.    : 10/398326
DATED              : August 14, 2007
INVENTOR(S)        : Norbert Lutz et al.

It is certified that error appears in the above-identified patent and that said Letters Patent is hereby corrected as shown below:

Title Page

Item 73-- Assignee
   Should read Leonhard Kurz GmbH & Co. KG

Item 74— Attorney, Agent, or Firm
   Should read Hoffmann & Baron, LLP

Signed and Sealed this

Twenty-seventh Day of November, 2007

JON W. DUDAS
*Director of the United States Patent and Trademark Office*